United States Patent
Shin

(10) Patent No.: US 7,343,161 B2
(45) Date of Patent: Mar. 11, 2008

(54) METHODS AND SYSTEM FOR SETTING UP CALL IN CDMA MOBILE COMMUNICATION SYSTEM

(75) Inventor: Yeong Jong Shin, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 1100 days.

(21) Appl. No.: 09/960,359

(22) Filed: Sep. 24, 2001

(65) Prior Publication Data

US 2002/0037712 A1 Mar. 28, 2002

(30) Foreign Application Priority Data

Sep. 22, 2000 (KR) .......................... 10-2000-55786

(51) Int. Cl.
*H04Q 7/20* (2006.01)
(52) U.S. Cl. .................... 455/445; 455/432.1
(58) Field of Classification Search ............. 455/432.1, 455/433, 436, 438, 442, 445–446, 517, 524, 455/414.1, 450, 451, 452.2, 428, 459; 370/261, 370/329, 338, 341–342, 352–353
See application file for complete search history.

(56) References Cited

U.S. PATENT DOCUMENTS

| | | | | |
|---|---|---|---|---|
| 3,706,996 | A * | 12/1972 | Hafner | 370/295 |
| 5,321,514 | A * | 6/1994 | Martinez | 725/62 |
| 5,761,195 | A * | 6/1998 | Lu et al. | 370/329 |
| 6,061,566 | A * | 5/2000 | Friman | 455/445 |
| 6,144,647 | A * | 11/2000 | Lopez-Torres | 370/329 |
| 6,317,609 | B1 * | 11/2001 | Alperovich et al. | 455/556.1 |
| 6,374,112 | B1 * | 4/2002 | Widegren et al. | 455/452.2 |
| 6,493,553 | B1 * | 12/2002 | Rollender | 455/435.2 |
| 6,628,943 | B1 * | 9/2003 | Agrawal et al. | 455/432.1 |
| 7,058,076 | B1 * | 6/2006 | Jiang | 370/465 |
| 2001/0046863 | A1 * | 11/2001 | Rinne et al. | 455/442 |

FOREIGN PATENT DOCUMENTS

| | | |
|---|---|---|
| CN | 1143442 | 5/1995 |
| JP | 2002-517965 A | 6/2002 |
| WO | WO 99/63773 A1 | 12/1999 |

OTHER PUBLICATIONS

Japanese Office Action dated Nov. 29, 2004 Special Issue of Next Generation Network Techniques (vol. 6, p. 24-31).
Japanese Office Action dated Nov. 29, 2004 Special Issue of Next Generation Network Techniques (vol. 6, p. 24-31), no date provided.

* cited by examiner

*Primary Examiner*—Jean Gelin
(74) *Attorney, Agent, or Firm*—Ked & Associates, LLP

(57) ABSTRACT

A method and system for setting up a call in a CDMA mobile communication system, which is suitable for real time transmission of a fast data, such as a video data, between origination and termination mobile stations is disclosed. The method includes setting up a call between an origination side mobile station and a termination side mobile station, transferring bearer information between an origination base station controller (BSC) and a termination BSC through the set up call, to set up a bearer path between the two BSCs, transferring a data of a mobile station between the origination BSC and the termination BSC through the set up bearer path, and clearing the set up call and bearer path after the data is transferred.

29 Claims, 6 Drawing Sheets

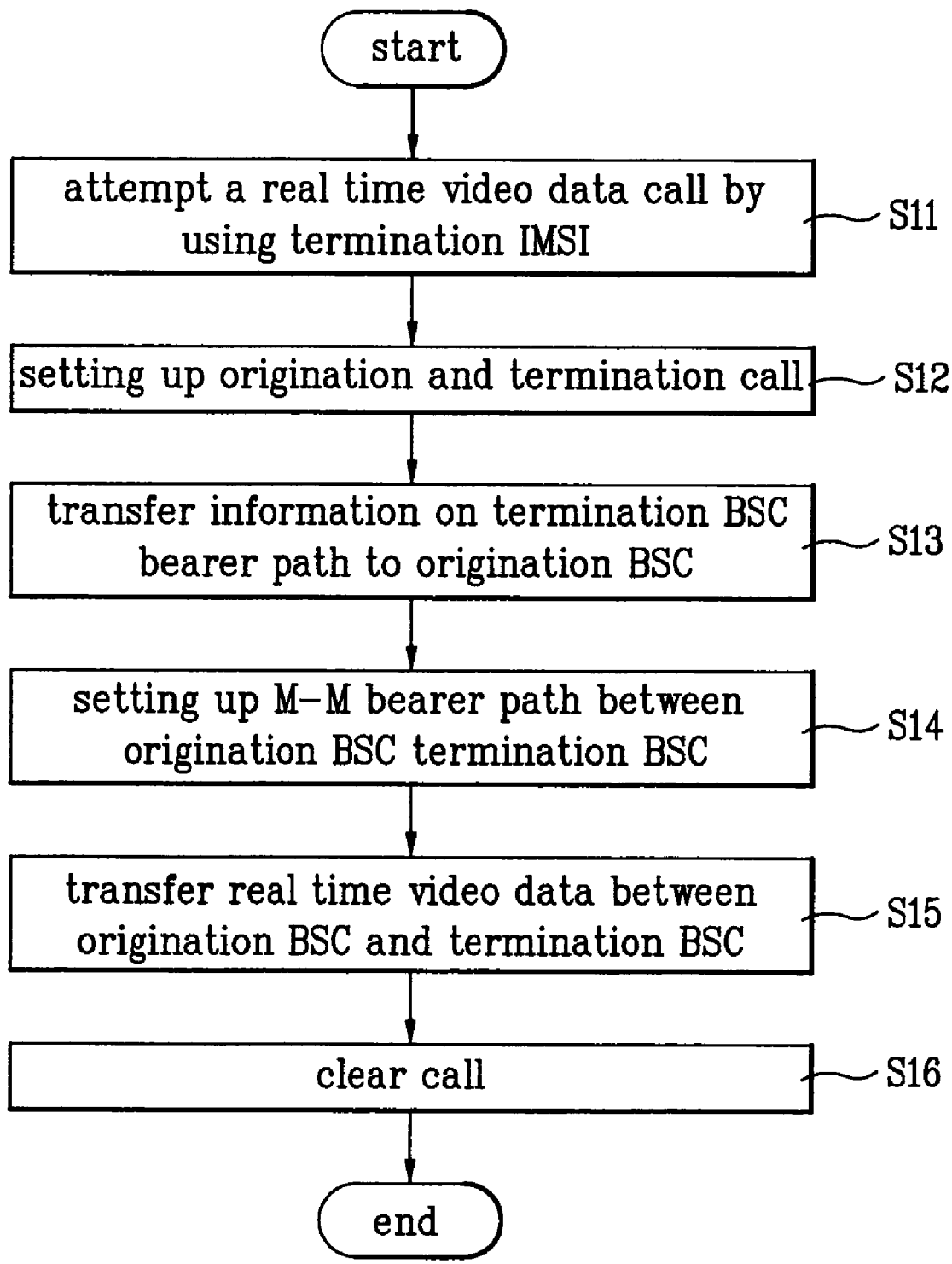

METHODS AND SYSTEM FOR SETTING UP CALL IN CDMA MOBILE COMMUNICATION SYSTEM

BACKGROUND OF THE INVENTION

1. Field of the Invention

The present invention relates to a CDMA mobile communication system, and more particularly to a method and system for setting up a call in a CDMA mobile communication system.

2. Background of the Related Art

Data exchange in a CDMA mobile communication system is typically made either by circuit switching or packet switching. In circuit switching, information is exchanged by setting up a fixed communication path or a line between two mobile stations. Once the communication path is set up, the communication path is dedicated for transmission of information of one transaction, and is used as a dedicated line. Moreover, since no sub-networks interfere with the information through the communication path once the communication path is set up, circuit switching has no limitation in forms, codes, and transmission control processes.

In packet switching, information from an originating mobile station is accumulated, divided into fixed lengths, and transmitted in packets after an address of a receiver is provided.

A typical CDMA mobile communication system is provided with mobile stations (MS), base transceiver stations (BTS), base station controllers (BSC), a mobile switching center (MSC), and a home location register (HLR). The MS provides a terminal function for a subscriber to receive mobile communication service. The MS makes a random access in response to initiation of an originating signal and call, performs a home location registration and system information broadcasting, and receives an origination signal in a standby mode. It further provides a priority call connection and quality measurement of a communication link and links of adjacent cells.

The BTS makes radio access to the mobile station, and wire or wireless connection between the mobile station and the base station controller (BSC). The BSC is positioned between the BTS and the MSC, and manages and controls the BTS to perform operation management of the BTS, radio channel assignment control, determination and execution of hand over, and discontinuation of transmission and reception.

The MSC provides mobile communication service to a subscriber. The MSC provides line switching between subscribers, input-output relay call processing, handoff, paging, and roaming.

The HLR is a database center for managing a state of the subscriber, including present position information of the mobile station, and statistics and information related to various services.

FIG. 1 illustrates a related art system for setting up a call in a CDMA mobile communication system. Referring to FIG. 1, a data service network of the CDMA mobile communication system is provided with an origination side mobile station 10, a subscriber mobile terminal, first and second BTS 12 and 13 for radio interface with the origination side mobile station 10, and a BSC 16 for managing and controlling the first and second BTS 12 and 13. The network is further provided with a termination side mobile station 11, a subscriber mobile terminal, third and fourth BTS 14 and 15 for radio interface with the termination side mobile station 11, and a termination side BSC 17 for managing and controlling the third and fourth BTS 14 and 15. Next, a MSC 18 is provided for controlling a call from the origination side BSC 16 and the termination side BSC 17, and a HLR 19 is connected to the MSC 18 for storage and processing of position information for the subscriber to set up a call. The network further includes an Inter Working Function (IWF) 20 interlocked with the MSC 18 for processing a circuit data, and a PSTN/PLMN ISDN 21 connected to the MSC 18. A router 22 is provided for switching between the originating BSC 16 and the termination BSC 17, and a Packet Data Service Node (PDSN) 23 is connected to the router 22 for processing a packet data. An Internet Protocol (IP) network 24 connected to the PDSN 23 provides the Internet service, a Home Agent (HA) 25 connected to the IP network 24 manages position information on the origination side MS 10 and the termination side MS 11, and an AAA server 26 connected to the IP network 24 authenticates and confirms origination side MS 10 and termination side MS 11 that have roamed from other Internet Service providers (ISP) or a Public Land Mobile Network (PLMN).

A circuit data call or a packet data call can be provided for a data call in the CDMA mobile communication system. The circuit data in a range of 14.4 kpbs-64 Kbps is processed in interlock of the MSC 18 and the JWF 20, and the PDSN 23 provides a service to process a packet data of 144 kpbs or 384 kpbs class.

The method for processing a call in the related art CDMA mobile communication system has various problems. For example, a circuit data service requires 6 channels, each provided with a 64 Kbps channel capacity, of the MSC for supporting a 384 k class data. Such multiple channel usage requires complex call processing.

Additionally, in the packet data service, the call control required for real time data routing to anywhere on the Internet for real time data transmission between users on the Internet through the PDSN is not available. Furthermore, the packet data service made available by the PDSN is not suitable for transmitting fast data in real time between users, such as a picture telephone. Instead, it is limited to an Internet connection.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide method and system for setting up a call in a CDMA mobile communication system, which permits a real time fast transmission of a video data between users.

To achieve at least these objectives, in whole or in parts, there is provided a method for setting up a call in a CDMA mobile communication system, including (a) setting up a call between an origination side mobile station and a termination side mobile station, (b) transferring bearer information between an origination base station controller (BSC) and a termination BSC through the set up call, to set up a bearer path between the two BSCs, (c) transferring a data of a mobile station between the origination BSC and the termination BSC through the set up bearer path, and clearing the set up call and bearer path after the data is transferred.

To further provide at least the above objects, in whole or in parts, there is provided a system for setting up a call in a CDMA mobile communication system, including origination and termination mobile stations, at least one 6rst BTS (Base Transceiver Station) for making radio interface with the origination mobile station, an origination BSC for managing and controlling the first BTS, at least one second BTS for making radio interface with the termination mobile station, termination BSC for managing and controlling the second BTS, an MSC for controlling calls of the origination BSC and the termination BSC, a home location register connected to the MSC for storage and processing position information for paging subscribers of the mobile stations; and a router for setting a direct link between the origination side BSC and the termination side BSC for setting a video data call.

To further provide at least the above objects, in whole or in parts, there is provided a method for setting up a call in a mobile communication system, including setting up a call between an origination side mobile station and a termination side mobile station, transferring bearer information between an origination base station controller (BSC) and a termination BSC through the set up call, to set up a bearer path between the origination and termination BSC, and transferring data of a mobile station between the origination BSC and the termination BSC through the set up bearer path.

To further provide at least the above objects, in whole or in parts, there is provided an origination base station controller (BSC), configured to manage and control at least one origination device, a termination BSC, configured to manage and control at least one termination device, and a router coupled to form a direct bearer channel between the origination BSC and the termination BSC to allow for real time transfer of video data between the at least one origination device and the at least one termination device.

To further provide at least the above objects, in whole or in parts, there is provided a mobile communication system, including origination and termination mobile stations, at least one first Base Transceiver Station (BTS) to form a radio interface with the origination mobile station, an origination BSC configured to manage and control the first BTS, at least one second BTS to form a radio interface with the termination mobile station, a termination BSC configured to manage and control the second BTS, a mobile switching center (MSC) to control calls of the origination BSC and the termination BSC, a home location register connected to the MSC for storage and processing position information for paging subscribers of the mobile stations, and a router to establish a direct link between the origination side BSC and the termination side BSC to a video data call.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 illustrates a flow chart of the steps of a method for setting up a call in a CDMA mobile communication system according to a preferred embodiment of the present invention;

DETAILED DESCRIPTION OF PREFERRED EMBODIMENTS

Figure 1:
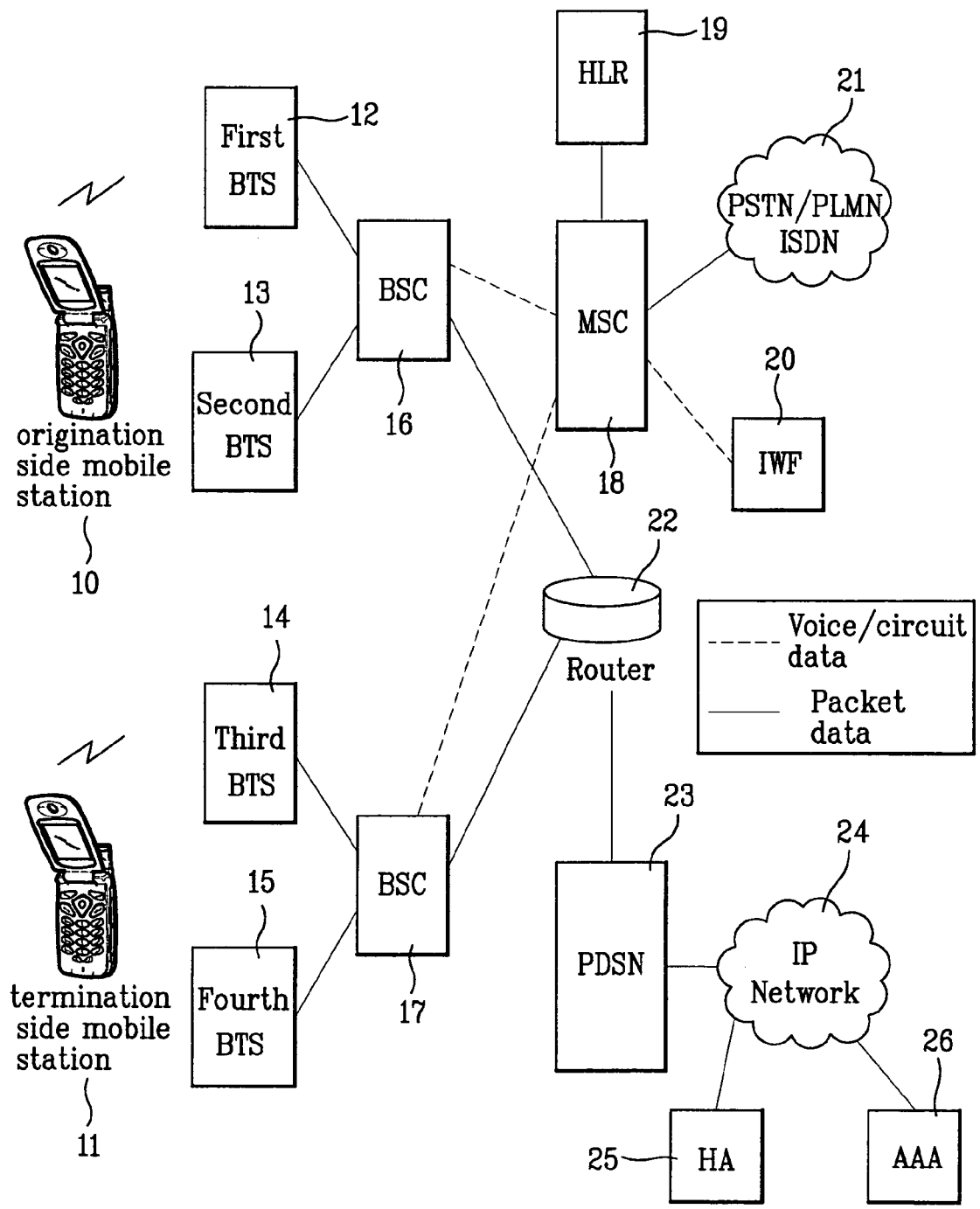
FIG. 1 illustrates a system for setting up a call in a related art CDMA mobile communication system.
Figure 2:
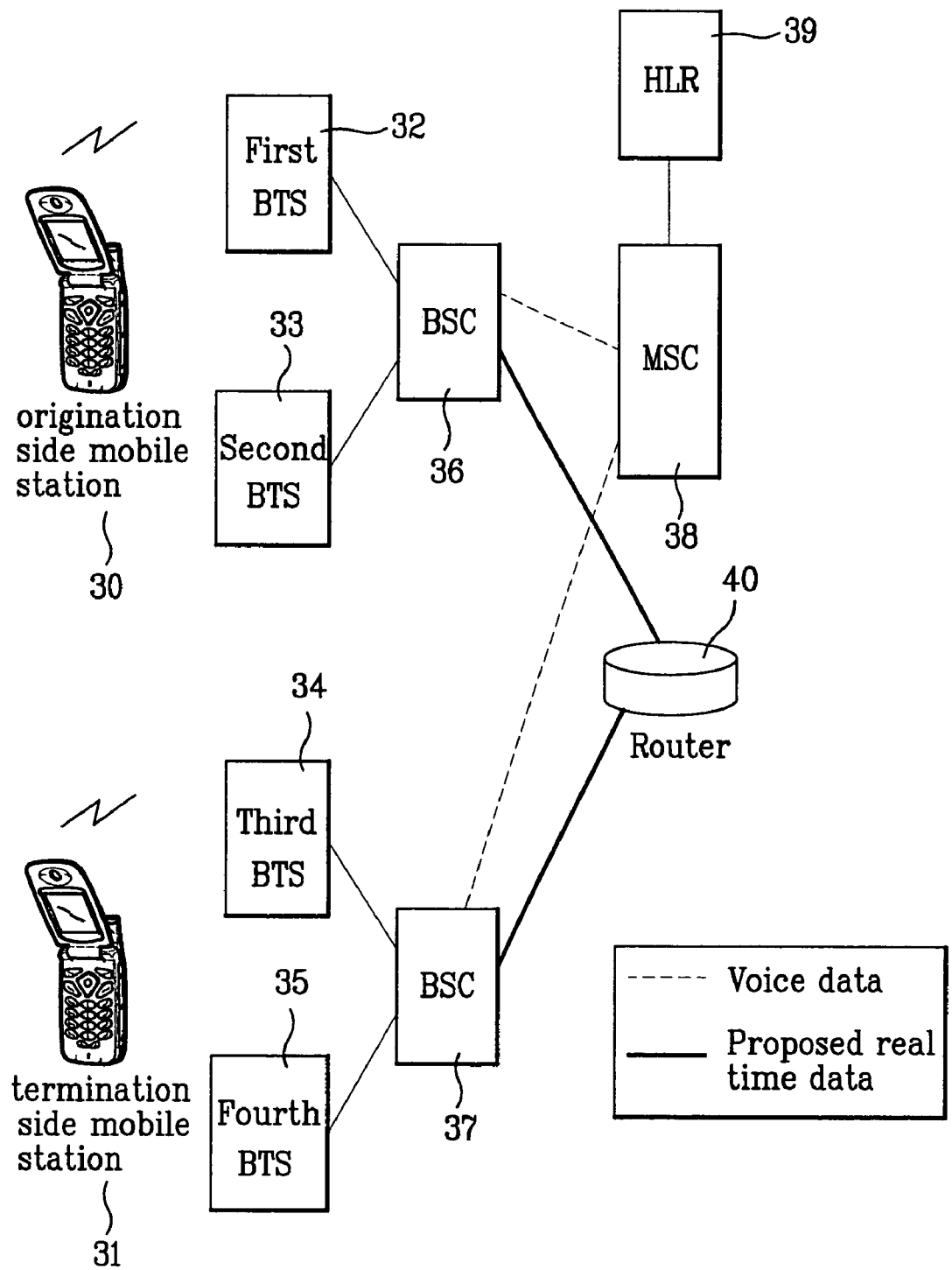
FIG. 2 illustrates a system for setting up a call in a CDMA mobile communication system according to a preferred embodiment of the present invention.

FIG. 2 illustrates a system for setting up a call in a CDMA mobile communication system in accordance with a preferred embodiment of the present invention. Referring to FIG. 2, a CDMA mobile communication system in accordance with a preferred embodiment of the present invention preferably includes an origination side mobile station 30, such as a subscriber mobile terminal, first and second BTS 32 and 33 for radio interface with the origination side mobile station 30, and a BSC 36 for managing and controlling the first and second BTS 32 and 33. The system further includes a termination side mobile station 31, such as a subscriber mobile terminal, third and fourth BTS 34 and 35 for radio interface with the termination side mobile station 31, and a termination side BSC 37 for managing and controlling the third and fourth BTS 34 and 35.

Next, a MSC 38 is provided for controlling calls from the origination side BSC 36 and the termination side BSC 37, and an HLR 39 is connected to the MSC 38 for storage and processing position information for paging the subscriber. Finally, a router 40 is provided for setting up a direct link between the originating BSC 36 and the termination BSC 37. The direct link through the router 40 is capable of providing real time data communication. This communication is preferably at a rate of at least 1 Mbps-5 Mbps, and can be video data.

A method for setting up a call in the foregoing CDMA mobile communication system of the present invention will be described. First, a subscriber of the origination side mobile station 30 initiates a call by providing an International Mobile Station Identity (IMSI) of the termination side mobile station 31. The origination side mobile station 30 thus establishes a radio interface with the first BTS 32 or the second BTS 33 of the cell region in which the mobile station is located. The BSC 36 manages and controls the first BTS 32 or the second BTS 33 with which the origination side mobile station 30 has made the radio interface.

A method for setting up a call in the foregoing CDMA mobile communication system of the present invention will be described. First, a subscriber of the origination side mobile station 30 initiates a call by providing an International Mobile Subscription Identity (IMSI) of the termination side mobile station 31. The origination side mobile station 30 thus establishes a radio interface with the first BTS 32 or the second BTS 33 of the cell region in which the mobile station is located. The BSC 36 manages and controls the first BTS 32 or the second BTS 33 with which the origination side mobile station 30 has made the radio interface.

The MSC 38 provides a mobile communication service through the origination BCS 36. The MSC 38 thus confirms positional information of the termination side mobile station 31 that the origination side mobile station 30 is attempting to call, and sets up the call between the origination side mobile station 30 and the termination side mobile station 31. The call is preferably set up through the termination side BSC 37 at the position indicated by the positional information and either the third BTS 34 or the fourth BTS 35 under the control of the termination side BSC 37.

The origination side mobile station 30 and the destination side mobile station 31 next define a new service option for a real time video data before the call is set up by using IMSI. The newly defined service option is defined by modifying a service option related to an existing speech call and data call. A real time video data call has a communication path marked in FIG. 2 with thick solid lines and dashed lines. The thick lines represent a path that is set up by the router 40, which sets up links between the origination side BSC 36 and the termination side BSC 37. The dashed lines represent a control path related to interpretation of a subscriber number of the termination side mobile station 31, and call origination and termination is identical to the speech call path shown in dashed lines.

Relevant versions of the CDMA CAI standard (IS-95A/B, J-STD-008, IS-2000) are applied to origination and termination radio channel setting up processes respectively identical to a speech call process. The CDMA mobile communication system shown in FIG. 2 is of an IS-2000 1X RTT CDMA mobile communication technology, the control between the origination BSC and the MSC, and the termination BSC and the MSC are applicable to TIA/EIA 3G IOS standard of the north American type.

Figure 4A:
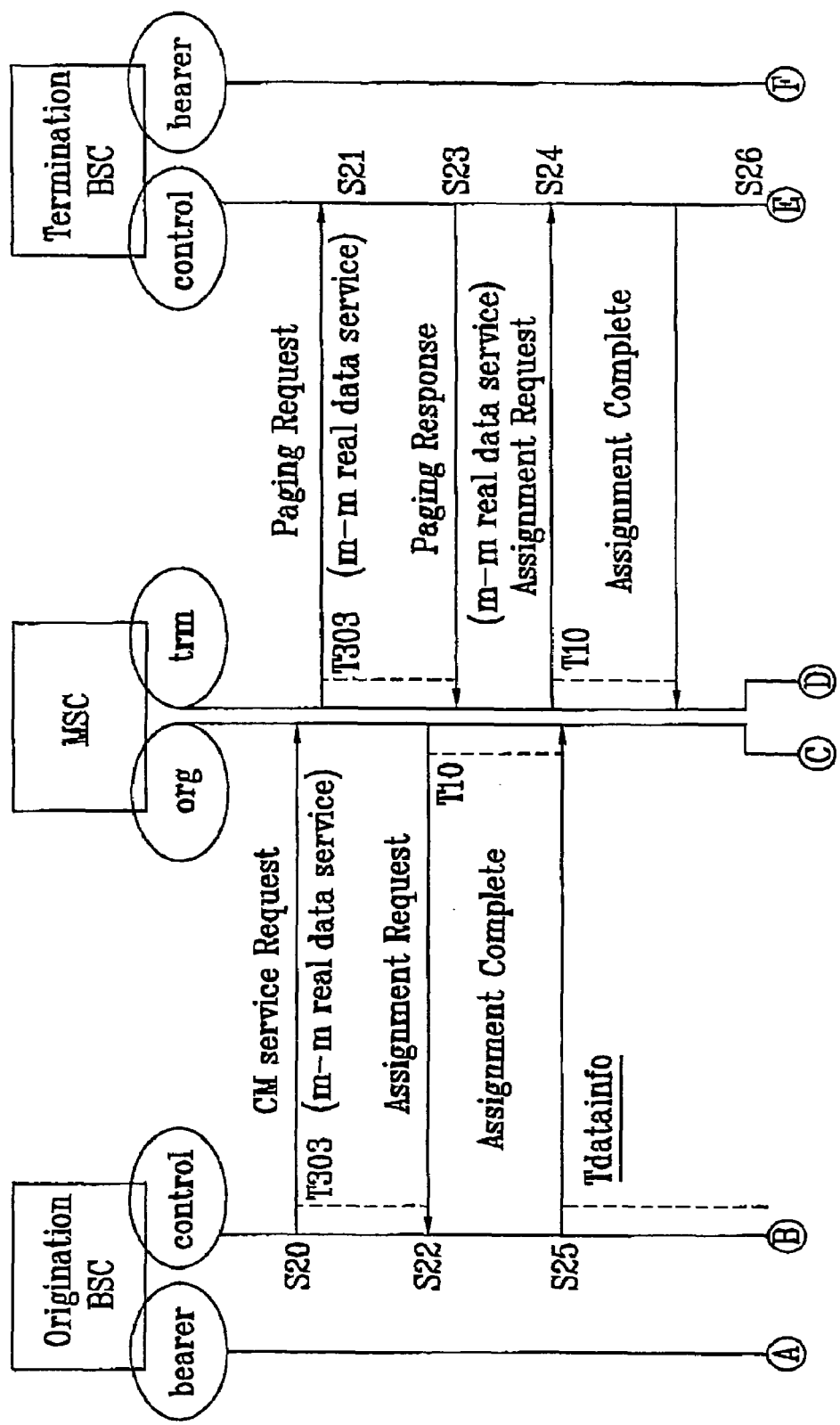
FIGS. 4A and 4B illustrate the steps of a bearer pass set up in a method for setting up a call in a CDMA mobile communication system according to a preferred embodiment of the present invention.
Figure 4B:
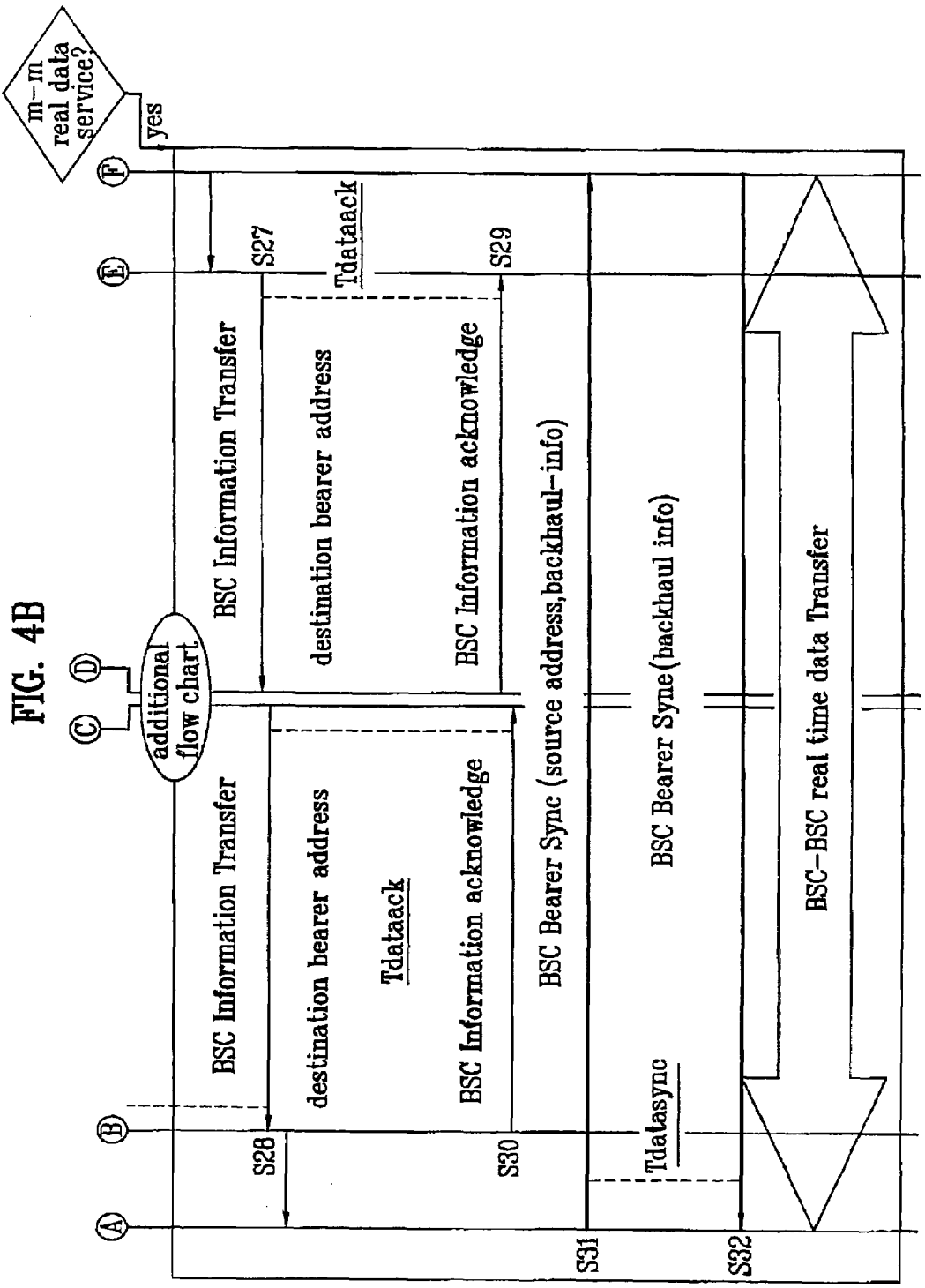

Referring next to FIG. 4, the steps of a bearer pass set up in a method for setting up a call in a CDMIA mobile communication system of the preferred embodiment will be described. Upon reception of a call set up message, including the newly defined real time data service option and termination digits, the origination BSC sends a request message for a Connection Management (CM) service to an origination side of the MSC. This message, which is a call set up request, is sent through the control path channel (S20). As a result of the request, the MSC interprets the termination number included from the origination side, refers to the HLR to find a position of the termination mobile station, and sends a paging request message, which includes the newly defined real time data service option, from the MSC to the termination side BSC through the control path channel (S21). The origination side of the MSC, which requests the mobile station for a radio link set up resource according to IS-2000 CAI, also requests the origination BSC for a resource assignment through the control path channel (S22).

Then, termination BSC bearer path information is transferred to the origination BSC using the circuit control path channel (S13). As a result of the transfer of step S13, a Mobile-Mobile (M-M) bearer path is set up between the origination BSC and the termination BSC (S14). After the bearer path is set up in step S14, the real time video data transmission is made between the origination BSC and termination BSC, in which user data of the origination and termination mobile stations is transmitted (S15). Subsequently, the call is cleared (S16). An existing IS-2000 CAI and 3G IOS A1 procedure is used for the call clearance.

Referring next to FIG. 4, the steps of a bearer pass set up in a method for setting up a call in a CDMA mobile communication system of the preferred embodiment will be described. Upon reception of a call set up message, including the newly defined real time data service option and termination digits, the origination BSC sends a request message for a Configuration Management (CM) service to an origination side of the MSC. This message, which is a call set up request, is sent through the control path channel (S20). As a result of the request, the MSC interprets the termination number included from the origination side, refers to the HLR to find a position of the termination mobile station, and sends a paging request from the MSC to the termination side BSC through the control path channel (S21). The origination side of the MSC, which requests the mobile station for a radio link set up resource according to IS-2000 CAI, also requests the origination BSC for a resource assignment through the control path channel (S22).

As a result of the paging request (S21), the termination BSC gives a termination side of the MSC a response to the call through the control path channel upon reception of a paging response from the termination mobile station (S23). The termination side of the MSC, which requests the mobile station for a radio link set up resource according to IS-2000 CAI, also requests the termination BSC for a resource assignment through the control path channel (S24). As a result of the resource assignment request (S24), the origination BSC sends an assignment complete message over the control path channel to the origination side of the MSC (S25) to indicate a completion of a radio link to the origination mobile station. Also, the termination BSC sends a message to the termination side of the MSC over the control path channel to indicate a completion of a radio link with the termination mobile station (S26). As a result of the completion (S26), a control channel is assigned between the origination BSC and the MSC, and the termination BSC and the MSC respectively, but no traffic channel is assigned.

When the control path is set up as the origination and the termination control channels are assigned, the bearer information, including the termination side bearer address, is transferred from the termination BSC to the origination side of the MSC through the control path channel using the new service option as BSC information (S27). The BSC information received at the termination side of the MSC is transferred from the origination side of the MSC to the origination side BSC through the control path (S28). For a positive transfer of the bearer pass information in the transfer steps S27 and S28, a timer is provided to the termination BSC and the origination MSC, so that the bearer information signal with the bearer address is transferred within a preset time period, and re-transferred for a present number of times if an error occurs.

As a result of the transfer (S27), a response to the BSC information is transferred from the termination side of the MSC to the termination BSC through the control path (S29). Also, as a result of the transfer (S28), a response to the BSC information is transferred from the origination BSC to the origination side of the MSC through the control path (S30). The timers are stopped after the transfers in steps S29 and S30.

The origination BSC, having received the bearer information with the bearer address of the termination BSC from the termination BSC through the MSC, transfers this bearer information to a bearer processor of the origination BSC (for example, a radio CDMA frame processor). The bearer processor also transfers the origination BSC bearer information and synchronization information from the origination BSC to the termination BSC using the received bearer address of the termination BSC (S31). For positive transfer of the origination BSC bearer information and synchronization information, a timer is provided to the origination BSC for transfer of information within a preset time period, and re-transfer of the information for a preset number of times if an error occurs.

As a result of the transfer (S31), the termination BSC bearer information and the synchronization information is transferred from the termination BSC to the origination BSC through the bearer path channel (S32). A bearer path is thus set up between the origination BSC and the termination BSC, to facilitate real time bi-directional transfer of video data and user data of the mobile stations belonging to the origination BSC and the termination BSC. Also, similar to circuit data processing in the ISDN network, an upper protocol processing is made in peer-to-peer protocol between the origination mobile station to the termination mobile station. The T303 and T10 in FIG. 4A denote standard timers, each with a prescribed threshold value set up therein.

Figure 5:
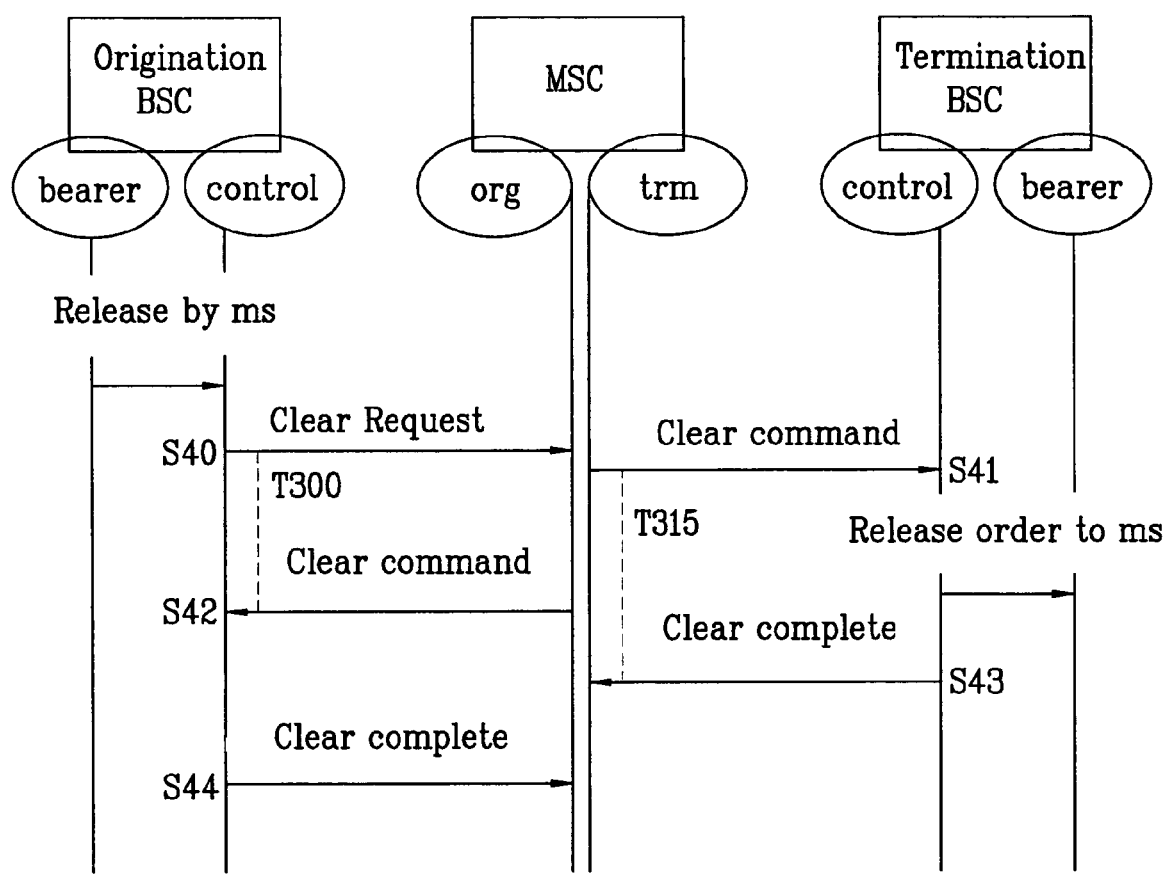
FIG. 5 illustrates a method for clearing a call in a CDMA mobile communication system according to the preferred embodiment of the present invention.

Referring next to FIG. 5, a method for clearing a call in a CDMA mobile communication system of the preferred embodiment is described. The method starts with a request from the origination BSC to the origination side of the MSC for clearing through the control path channel (S40). After the request (S40), a clear command is transferred from the termination side of the MSC to the termination BSC through the control path channel (S41). The clear command is then transferred from the origination side of the MSC to the origination BSC through the control path channel (S42).

As a result of the transfer in step S42, notification of the clearing of the radio link set up from the termination mobile station in the IS-2000 CAI protocol is provided from the termination BSC to the termination side of the MSC through the control path channel (S43). Also, as a result of the transfer in step S42, notification of the clearing of the radio link set up from the origination mobile station in the IS-2000 CAI protocol is provided from the origination BSC to the origination side of the MSC through the control path channel (S44). Once the call is cleared, the bearer path channel between the origination BSC and the termination BSC is recovered to the control path channel.

The method and system for setting up a call in a CDMA mobile communication system of the preferred embodiment has many advantages.

For example, by using a direct path between an origination BSC and a termination BSC, traffic resources of the MSC are prevented from being wasted, and use of the complex multiple 64 kpbs resources is avoided.

Also, the real time video data processing is applicable even to a control for 1 Mbps~5 Mbps class in fields, such as an IIMT-2000 services, as far as a network capacity between the origination BSC and the termination BSC is guaranteed.

Moreover, by using a verified control path between a BSC and an MSC in a bearer path set up, which is an additional control procedure suggested in the call set up, a ratio of call set up success to failure can be increased.

Furthermore, the preferred embodiment is applicable to a digital cellular system of IS-2000 1X RTT CDMA mobile communication technology, a personal handy phone system, a local loop system, and IMT-2000 system method, and system for setting up a call in a CDMA mobile communication system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for setting up a real time data call in a mobile communication system, comprising:

setting up a control path between an origination base station controller (BSC), a termination BSC and a mobile switching center (MSC) controlling the origination and termination BSCs when a call is set up between an origination side mobile station and a termination side mobile station;

transferring bearer information between the origination BSC and the termination BSC through the set up control path, wherein transferring bearer information comprises:

sending a request from the origination BSC to the MSC along the control path for Connection Management service carrying required information, for setting up a radio link with the origination side mobile station upon reception of a call set up message from the origination side mobile station, sending a request from the MSC to the termination BSC along the control path for a termination number for a call, to set up a radio link between the termination BSC and the termination side mobile station, and transferring bearer information of the termination BSC to the origination BSC along the control path, and transferring a response to the bearer information from the origination BSC to the termination BSC along the control path, to form the bearer path;

setting up the bearer path between the origination BSC and the termination BSC by using the bearer information transferred along the control path; and transferring real time video data of at least one of the origination side mobile station and the termination side mobile station between the origination BSC and the termination BSC through the set up bearer path without using traffic resources of the MSC.

2. The method of claim 1, wherein setting up the call comprises:

defining a new option for a real time video call related to a speech call and a data call;

inputting a termination side number in the newly defined option to initiate a real time video data call; and setting up origination and termination calls by the origination side and termination side mobile stations, the corresponding BSCs, and the MSC.

3. The method of claim 1, wherein only the bearer path and the control path are set up during the call set up and wherein no other traffic path is set up.

4. The method of claim 1, wherein the origination side mobile station and the termination side mobile station define a new service option for real time video data before the call is set up.

5. The method of claim 1, wherein if the bearer information and the response transferred to the origination BSC and the MSC are not transferred within a prescribed period of time, then a transfer error is determined to have occurred.

6. The method of claim 5, wherein re-transfer of the bearer information and the response transferred between the termination BSC and the origination BSC is attempted for a prescribed number of times if the transfer error has occurred.

7. The method of claim 1, wherein the bearer information of the termination BSC comprises a bearer address of the termination BSC.

8. The method of claim 1, wherein the response to the bearer information comprises a bearer address and synchronization information.

9. The method of claim 1, further comprising cleating the call and bearer path after the real time video data has been transferred.

10. The method of claim 9, wherein clearing the call and bearer path comprises:
sending a request from the origination BSC to the MSC to clear the bearer path;
transferring a clear command from the MSC to the origination and termination BSCs; and
sending a message from each of the origination and the termination BSCs to the MSC to inform the MSC of the completion of the clearing.

11. The method of claim 9, wherein a control path channel is used for communication between each of the origination and termination BSCs and the MSC.

12. The method of claim 1, wherein the video data is transferred at a rate of at least 1 Mbps between the origination side mobile station and the termination side mobile station using the set up bearer path.

13. The method of claim 1, wherein portions of the control paths are different than the set up bearer path.

14. A mobile communication system, comprising:
an origination base station controller (BSC), configured to manage and control at least one origination device;
a termination BSC, configured to manage and control at least one termination device;
a mobile switching center (MSC), configured to control the origination and termination BSCs; and
a router coupled to form a direct bearer channel corresponding to a bearer path between the origination BSC and the termination BSC to allow for real time transfer of video data between the at least one origination device and the at least one termination device,
wherein bearer information to set up the bearer path is transferred between the origination BSC and the termination BSC through control paths between the origination BSC, the termination BSC and the MSC, the control paths being different than the bearer path, and
wherein real time video data of at least one of the origination device and the termination device is transferred between the origination BSC and the termination BSC through the formed direct bearer channel without using traffic resources of the MSC.

15. The system of claim 14, wherein a data rate of the video call is at least 1 Mbps.

16. The system of claim 14, wherein the least one origination device comprises an origination mobile terminal and at least one origination base station transceiver configured to form a radio interface with the origination mobile terminal.

17. The system of claim 14, wherein the at least one termination device comprises a termination mobile terminal and at least one termination base station transceiver configured for a radio interface with the at least one termination device.

18. The system of claim 17, wherein the at least one termination device is identified by an International Mobile Subscription Identifier (IMSI), and wherein the least one origination device provides the IMSI to the router to establish the direct bearer channel to the at least one termination device.

19. The system of claim 14, further comprising a home location register configured to provide storage of position information and process the position information of a plurality of mobile stations within the network.

20. The mobile communication system of claim 14, wherein the bearer information to establish the direct link is obtained by:
sending a request from the origination BSC to the MSC along one of the control paths for Connection Management service carrying required information, for setting up a radio link with the origination device upon reception of a call set up message from the origination device,
sending a request from the MSC to the termination BSC along one of the control paths for a termination number for a call, to set up a radio link between the termination BSC and the termination device, and
transferring bearer information of the termination BSC to the origination BSC along the control path, and transferring a response to the bearer information from the origination BSC to the termination BSC along the control paths, to form the bearer path.

21. A mobile communication system, comprising:
origination and termination mobile stations;
at least one first Base Transceiver Station (BTS) to form a radio interface with the origination mobile station;
an origination BSC configured to manage and control the first BTS;
at least one second BTS to form a radio interface with the termination mobile station;
a termination BSC configured to manage and control the second BTS;
a mobile switching center (MSC) to control calls of the origination BSC and the termination BSC;
a home location register connected to the MSC for storage and processing position information for paging subscribers of the mobile stations; and
a router to establish a direct link between the origination BSC and the termination BSC to carry a real time video data call,
wherein bearer information to establish the direct link is transferred between the origination BSC and the termination BSC through control paths between the origination BSC, the termination BSC and the MSC, the control paths being different than the direct link, and
wherein real time video data of at least one of the origination and termination mobile stations is transferred between the origination BSC and the termination BSC through the direct link without setting up a traffic path through the MSC.

22. The system of claim 21, wherein the router is separate from the MSC.

23. The mobile communication system of claim 21, wherein the bearer information to establish the direct link is obtained by:
sending a request from the origination BSC to the MSC along one of the control paths for Connection Management service carrying required information, for setting up a radio link with the origination mobile station upon reception of a call set up message from the origination mobile station,
sending a request from the MSC to the termination BSC along one of the control paths for a termination number for a call, to set up a radio link between the termination BSC and the termination mobile station, and
transferring bearer information of the termination BSC to the origination BSC along one of the control paths, and transferring a response to the bearer information from the origination BSC to the termination BSC along one of the control paths, to form the bearer path.

24. A method for setting up a real time data call in a mobile communication system, comprising:
  setting up a call between an origination side mobile station and a termination side mobile station;
  transferring bearer information along control paths between an origination base station controller (BSC) and a termination BSC through the set up call to set up a bearer path between the origination and termination BSC, portions of the control paths being different than the bearer path; and
  transferring real time video data of at least one of the origination side mobile station and the termination side mobile station between the origination BSC and the termination BSC through the set up bearer path,
  wherein transferring the beater information comprises:
  sending a request from the origination BSC to a mobile switching center (MSC) along one of the control paths for Connection Management service carrying required information, for setting up a radio link with the origination side mobile station upon reception of a call set up message from the origination side mobile station;
  sending a request from the MSC to the termination BSC along one of the control paths for the termination number for a call, to set up a radio hnk between the termination BSC and the termination side mobile station; and
  transferring bearer information of the termination BSC to the origination BSC along the control paths, and transferring a response to the bearer information from the origination BSC to the termination BSC, to form the bearer path.

25. The method of claim 24, wherein if the bearer information and the response transferred to the origination BSC and the MSC are not transferred within a prescribed period of time, then a transfer error is determined to have occurred.

26. The method of claim 25, wherein re-transfer of the bearer information and the response transferred between the termination BSC and the origination BSC is attempted for a prescribed number of times if the transfer error has occurred.

27. The method of claim 24, wherein the bearer information of the termination BSC comprises a bearer address of the termination BSC.

28. The method of claim 24, wherein the response to the bearer information comprises a bearer address and synchronization information.

29. The method of claim 24, wherein transferring the real time video data includes transferring the real time video data through the set up bearer path without passing the real time video data through the MSC.

* * * * *